(12) United States Patent
Matthews

(10) Patent No.: US 9,397,560 B2
(45) Date of Patent: Jul. 19, 2016

(54) CONTROLLER FOR A POWER SUPPLY WITH TRANSITION REGION REGULATION

(71) Applicant: Power Integrations, Inc., San Jose, CA (US)

(72) Inventor: David Michael Hugh Matthews, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 46 days.

(21) Appl. No.: 14/460,617

(22) Filed: Aug. 15, 2014

(65) Prior Publication Data

US 2016/0049870 A1    Feb. 18, 2016

(51) Int. Cl.
| | |
|---|---|
| H02M 3/156 | (2006.01) |
| H02M 3/335 | (2006.01) |
| H02M 3/158 | (2006.01) |

(52) U.S. Cl.
CPC ............. *H02M 3/156* (2013.01); *H02M 3/158* (2013.01); *H02M 3/33507* (2013.01); *H02M 3/33523* (2013.01); *H02M 2003/1566* (2013.01)

(58) Field of Classification Search
CPC ............ H02M 3/156; H02M 3/33507; H02M 3/33523; H02M 3/1588; H02M 3/155; H02M 3/1582; H02M 2003/1566; H02M 2003/1557; H04B 2215/069
USPC ................. 323/282; 363/21.16, 21.17, 21.18, 363/21.08
See application file for complete search history.

(56) References Cited

U.S. PATENT DOCUMENTS

| | | | |
|---|---|---|---|
| 5,246,418 A | 9/1993 | Haynes et al. | |
| 5,949,213 A | 9/1999 | Lanni | |
| 6,366,066 B1 | 4/2002 | Wilcox | |
| 6,424,131 B1 * | 7/2002 | Yamamoto | H03K 17/0822 323/282 |
| 6,472,855 B2 | 10/2002 | Ball | |
| 6,580,258 B2 | 6/2003 | Wilcox et al. | |

(Continued)

FOREIGN PATENT DOCUMENTS

| | | |
|---|---|---|
| EP | 0 588 569 A2 | 3/1994 |
| EP | 0 696 832 A2 | 2/1996 |

(Continued)

OTHER PUBLICATIONS

Kepco KLP, KLP 75-33-1200, KLP 150-16-1200, KLP 300-8-1200, www.kepcopower.com, Kepco, Inc., 131-38 Sanford Avenue, Flushing, NY 11352, U.S.A., 2004, 2 pages.

*Primary Examiner* — Jessica Han
*Assistant Examiner* — Demetries A Gibson
(74) *Attorney, Agent, or Firm* — Blakely Sokoloff Taylor & Zafman LLP

(57) ABSTRACT

A method for regulating a flow of energy from an input to an output of a power converter includes receiving a first signal representative of an output voltage, and receiving a second signal representative of a current of the power converter. An output current of the power converter is determined in response to at least one of the first and second signals. A power switch of the power converter is switched to regulate the output current of the power converter to a substantially constant output current value for a first range of power converter output voltages, to regulate an output power of the power converter to a substantially constant power value for a second range of power converter output voltages, and to regulate the output voltage of the power converter at substantially a highest output voltage value of the second range of power converter output voltages.

16 Claims, 7 Drawing Sheets

(56) References Cited

U.S. PATENT DOCUMENTS

| | | |
|---|---|---|
| 7,061,778 B2 | 6/2006 | Odell et al. |
| 7,180,280 B2 | 2/2007 | Currell |
| 7,332,900 B2 | 2/2008 | Currell |
| 7,541,793 B2 | 6/2009 | Saeueng et al. |
| 7,728,572 B2 | 6/2010 | Currell |
| 8,098,506 B2 | 1/2012 | Saint-Pierre |
| 8,139,384 B2 | 3/2012 | Kung et al. |
| 8,188,724 B2 | 5/2012 | Currell |
| 2003/0197497 A1 | 10/2003 | Barcelo et al. |
| 2004/0257271 A1 | 12/2004 | Jacobson et al. |
| 2006/0164048 A1 | 7/2006 | Muterspaugh |
| 2006/0279266 A1* | 12/2006 | Currell .................. H02M 3/156 323/282 |
| 2013/0148387 A1* | 6/2013 | Ren ......................... H02M 1/36 363/21.16 |

FOREIGN PATENT DOCUMENTS

| | | |
|---|---|---|
| GB | 2 079 014 A | 1/1982 |
| JP | 59-072882 A | 4/1984 |
| JP | 01-194866 A | 8/1989 |
| JP | 07-177737 A | 7/1995 |
| JP | 2001-286140 A | 10/2001 |
| JP | 2002-169618 A | 6/2002 |

* cited by examiner

CONTROLLER FOR A POWER SUPPLY WITH TRANSITION REGION REGULATION

BACKGROUND INFORMATION

1. Field of the Disclosure

The present invention relates generally to electronic circuits, and more specifically, the invention relates to switch mode power supplies.

2. Background

A common application for a switch mode power supply is a battery charger. The output power of a battery charger is usually controlled to provide regulated output voltage and regulated output current. The output voltage is regulated between a maximum and a minimum voltage over a range of output current. The output current is regulated between a maximum and a minimum current over a range of output voltage. A feedback signal is used to regulate the output of a switch mode power supply such that the output voltage and output current stay within the specified limits.

The switch mode power supply typically has a fault protection feature that prevents excessive output voltage and/or excessive output current in the absence of a feedback signal. Without this fault protection feature, the loss of the feedback signal could cause the output voltage and/or output current to go high enough to damage the output load (which could be a battery) and/or the switch mode power supply. With this fault protection feature, the absence of a feedback signal typically causes the switch mode power supply to operate in an auto-restart cycle that substantially reduces the average output voltage and/or output current until the feedback signal is restored.

A sustained attempt to take more power from the output than the battery charger can provide will prevent the power supply from regulating both output voltage and output current. The control circuit of the battery charger typically interprets a loss of regulation for more than a threshold time like an absence of feedback signal that triggers the fault protection feature.

Low cost circuits that regulate output current typically have loose tolerances. Battery chargers that use such circuits must guarantee a low value of a maximum output current at one end of the tolerance range, and they must guarantee no more than a high value of maximum output current at the other end of the tolerance range. The need to consider the addition of tolerances in other parameters can cause the design to be capable of substantially higher power than necessary. Failure to deliver all the power required by the load will cause the power supply to lose regulation and to enter a self-protection mode. Higher power capability typically requires a larger magnetic component or a larger power switch, which raises the cost of the power supply.

Battery chargers usually exhibit an abrupt transition between the regulated output voltage and the regulated output current. That is, the locus of output voltage and output current plotted in Cartesian coordinates usually has a sharp corner of approximately 90 degrees at the point of transition that corresponds to the point of maximum output power.

The typical practice of designing a battery charger with a sharp transition between the regulated output voltage and the regulated output current can result in a product that costs more than necessary to meet the requirements. A controlled regulated transition from a regulated output voltage to a regulated output current can allow the use of lower cost components.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
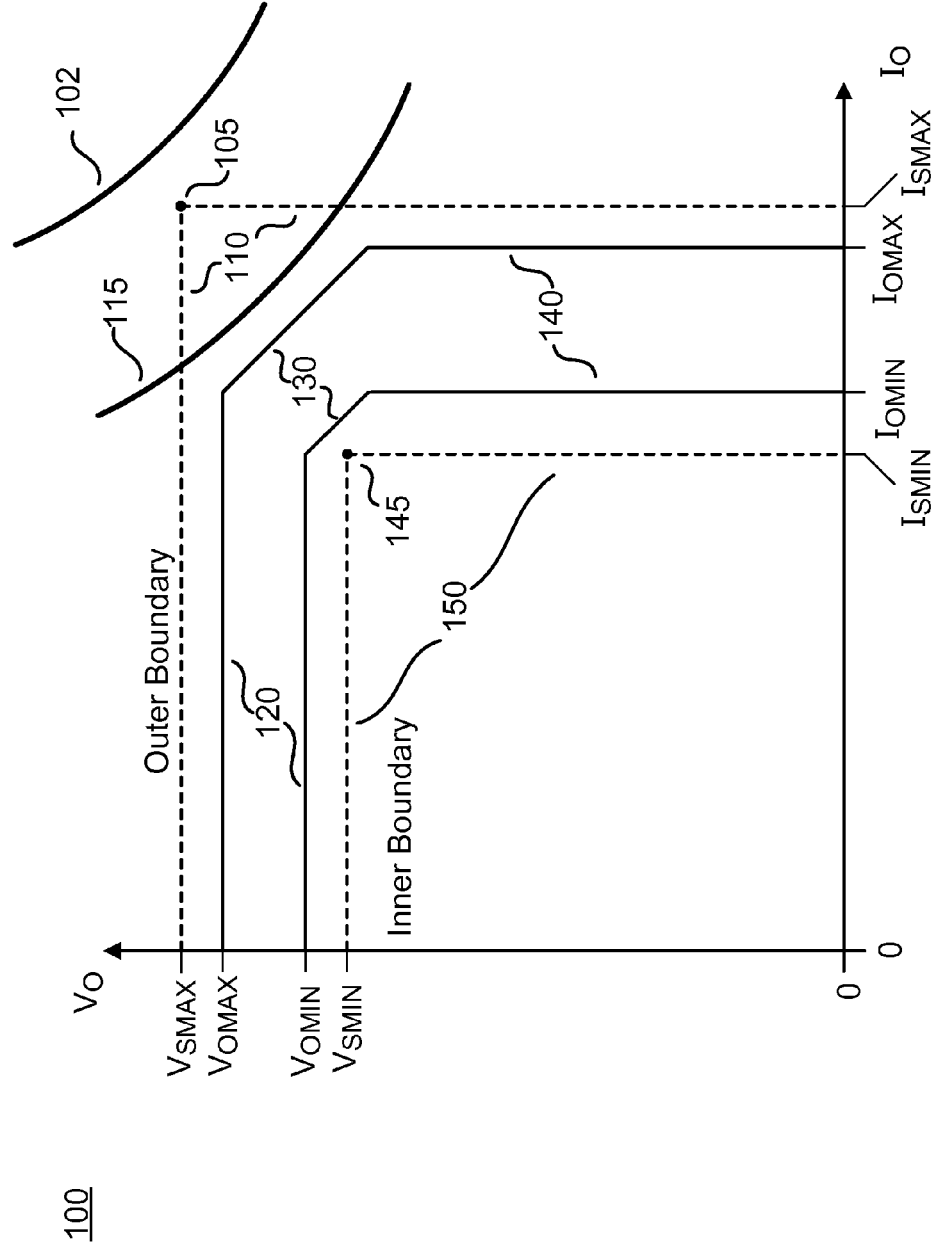
FIG. 1 shows boundaries of output voltage and output current for a power supply that could operate in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Techniques are disclosed to provide a regulated transition between the regulated output voltage and regulated output current of a power supply, allowing a switch mode power supply to perform as a battery charger at a reduced cost. As will be discussed, it is possible to avoid the higher cost associated with higher than necessary power capability by using a regulated transition between the regulated output voltage and the regulated output current in accordance with the teachings of the present invention. The regulated transition maintains a feedback signal to avoid entering an auto-restart mode while it allows a reduction in the maximum power capability. The regulated transition may provide the power supply with a constant output power characteristic within a region of output voltage and output current. It is also possible to adjust voltage and current thresholds that define the boundaries of the regulated transition in response to signals received from a device that may use the power supply to charge a battery.

Every switched mode power supply has a maximum power capability that describes a boundary on the plot of output voltage and output current. In conventional designs, the maximum capability boundary is set beyond the point of maximum specified output power, which is the intersection of maximum specified output voltage and maximum specified output current. In embodiments of the present invention, the maximum capability boundary is set below the point of maximum specified output power, and uses a regulated transition between regulated output voltage and regulated output current to avoid loss of feedback signal that would cause the power supply to operate in a self-protection mode. As a result, the locus of output voltage and output current in the regulated transition can be made to follow a path below the maximum capability boundary to reduce the cost of the design according to embodiments of the present invention.

To illustrate, FIG. 1 is graph 100 that shows the possible values of output voltage and output current of a power supply. The broken lines in FIG. 1 show typical specification limits of output voltage and output current for a battery charger. The broken lines for $V_{SMAX}$ and $I_{SMAX}$ that define the specified outer boundary for operation intersect at a point 105 that is the outer maximum power point. The broken lines for $V_{SMIN}$ and $I_{SMIN}$ that define the specified inner boundary for operation intersect at a point 145 that is the inner maximum power point. The power supply need only operate between the outer boundary 110 and inner boundary 150 to meet the specified requirements.

In a typical switch mode power supply, a capability boundary 102 that describes maximum power capability of the power supply is set beyond the outer maximum power point 105 to guarantee regulated operation within the specified outer and inner boundaries 110 and 150 respectively. The use of a power switch with lower rated current or the use of an energy storage element that can store less energy can reduce the cost of the power supply, but these measures also reduce the maximum power capability of the power supply. The capability boundary for a reduced cost power supply can be within the boundaries of specified operation 110 and 150 as illustrated by the capability boundary 115 in accordance with the teachings of the present invention.

FIG. 1 shows capability boundary 115 between the outer maximum power point 105 and the inner maximum power point 145. In order to maintain regulated operation, the output voltage and output current is controlled within boundaries such that the maximum output power remains below maximum capability boundary 115 in accordance with the teachings of the present invention.

In FIG. 1, solid horizontal lines 120 are the boundaries of a regulated voltage region between $V_{OMIN}$ and $V_{OMAX}$. Solid vertical lines 140 are the boundaries of a regulated current region between $I_{OMIN}$ and $I_{OMAX}$. Solid sloping lines 130 are the boundaries of a regulated transition region in accordance with the teachings of the present invention.

As shown in FIG. 1, the boundaries 130 of the regulated transition region are below the maximum capability boundary 115 and above inner maximum power point 145 to maintain operation within specifications. A designer may choose the regulation boundaries 120, 130, 140, and the position of the capability boundary 115 to achieve a reduced cost according to embodiments of the present invention. Use of a regulated transition region 130 of the proper shape allows the designer to manage tradeoffs between tolerances and cost for embodiments of the present invention.

Figure 2:
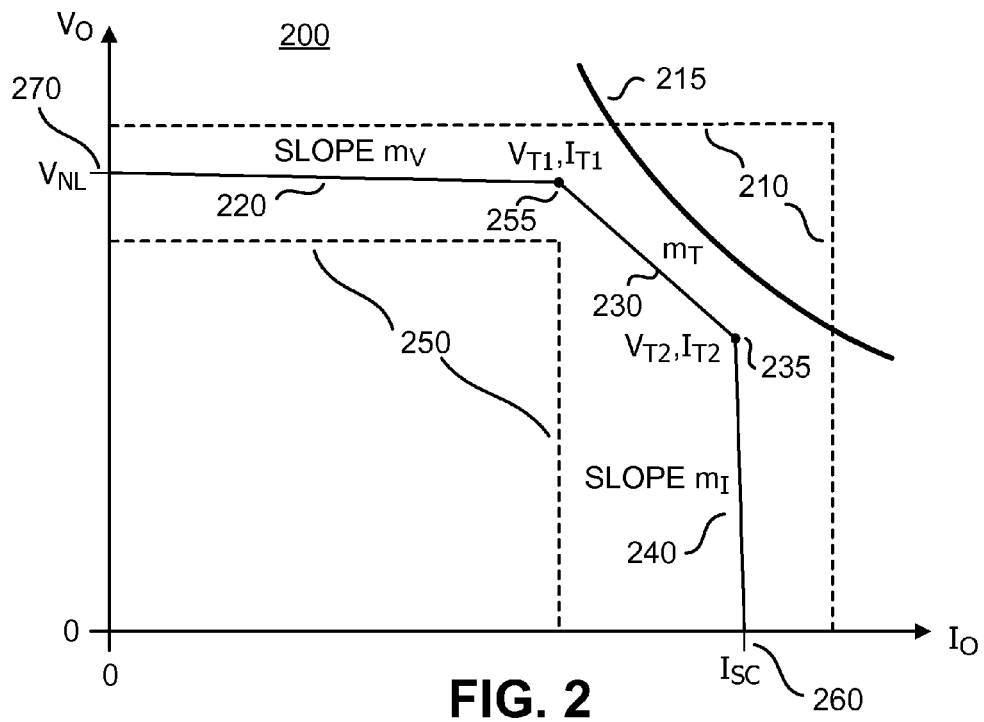
FIG. 2 shows the output characteristics of a power supply that operates within boundaries in accordance with the teaching of the present invention.

FIG. 2 is a graph 200 showing the typical output characteristic of a power supply that has a regulated voltage region of operation, a regulated current region of operation, and a regulated transition region of operation in accordance with the teaching of the present invention. The power supply operates along line segment 220 having slope $m_V$ in the regulated voltage region of operation, regulating the output voltage from a no-load voltage $V_{NL}$ 270 at zero output current to a first transition voltage $V_{T1}$ at a first output transition current $I_{T1}$. Thus, in the illustrated example, the power supply operates in the regulated voltage region of operation along line segment 220 with slope $m_V$ when the output current of the power supply is less than the first output transition current $I_{T1}$.

The power supply operates along line segment 230 having slope $m_T$ in the regulated transition region of operation, to regulate output voltage and output current between a first transition point 255 at a first output transition voltage $V_{T1}$ corresponding to a first output transition current $I_{T1}$, and a second transition point 235 at second output transition voltage $V_{T2}$ corresponding to a second output transition current $I_{T2}$. Thus, in the illustrated example, the power supply operates in the regulated transition region of operation along line segment 230 and restricts the voltage and current to be less than the maximum power capability of the power supply with slope $m_T$ when the output current of the power supply is between first output transition current $I_{T1}$ and the second output transition current $I_{T2}$ and/or when the output voltage of the power supply is between first output transition voltage $V_{T1}$ and the second output transition voltage $V_{T2}$. The power supply operates along line segment 240 having slope $m_I$ in the regulated current region of operation to regulate output current between $I_{T2}$ at the second transition point 235 and short circuit current $I_{SC}$ at zero output voltage. Thus, in the illustrated example, the power supply operates in the regulated current region of operation along line segment 240 with slope $m_I$ when the output voltage of the power supply is less than the second output transition voltage $V_{T2}$.

In one example, it is appreciated that a first output voltage $V_O$ range from 0 to $V_{T2}$, in which the power supply operates in the regulated current region, plus a second output voltage $V_O$ range from $V_{T2}$ to $V_{T1}$, in which the power supply operates in the regulated transition region, is substantially constant. When operating in the regulated voltage region, it is noted that the power supply is operating with the output voltage $V_O$ at substantially the highest output voltage value of the second output voltage $V_O$ range from $V_{T2}$ to $V_{T1}$, as illustrated in FIG. 2. In another example, it is appreciated that the highest output voltage value of the second range of power converter output voltages may be adjusted in response to the output current of the power converter in accordance with the teachings of the present invention.

Figure 3:
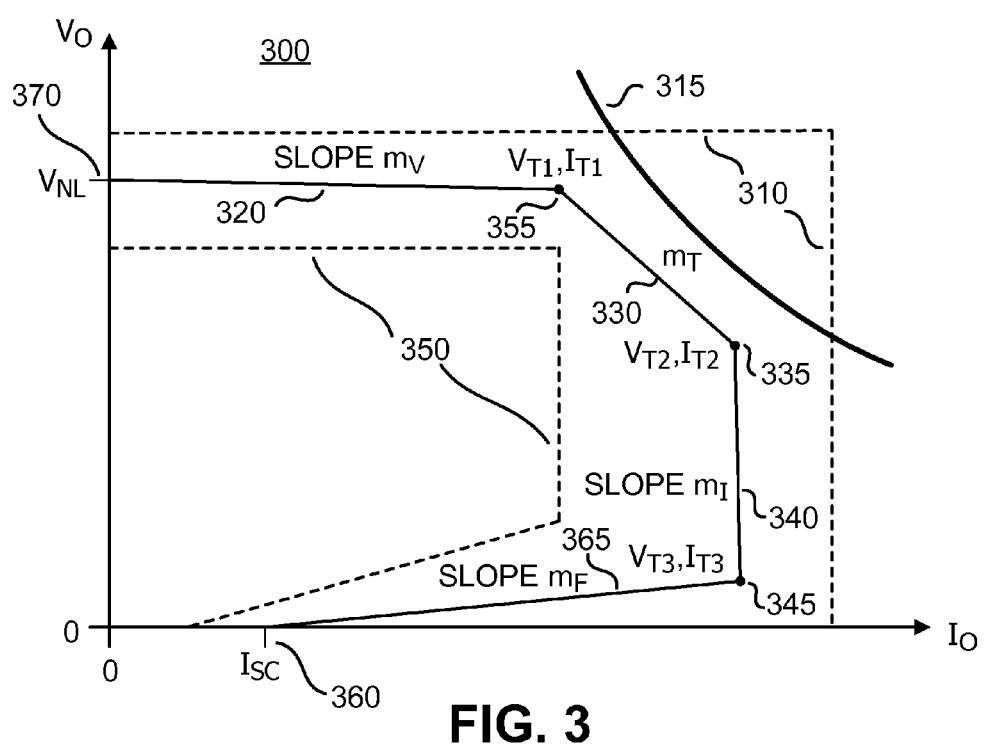
FIG. 3 shows the output characteristics of a power supply including a foldback region that operates within boundaries in accordance with the teaching of the present invention.

FIG. 3 is a graph 300 showing the typical output characteristic of another example power supply that has a regulated voltage region of operation, a regulated current region of operation, a foldback region of operation, and a regulated transition region of operation in accordance with the teaching of the present invention. In contrast to the example output characteristic of the example power supply illustrated in FIG. 2, the output characteristic in FIG. 3 has an additional region, the foldback region, where the output current decreases as the output voltage decreases.

The power supply with the output characteristic illustrated in FIG. 3 operates along line segment 320 having slope $m_V$ in the regulated voltage region of operation, regulating the output voltage from a no-load voltage $V_{NL}$ 370 at zero output current to a first transition voltage $V_{T1}$ at a first output transition current $I_{T1}$. Thus, in the illustrated example, the power supply operates in the regulated voltage region of operation along line segment 320 with slope $m_V$ when the output current of the power supply is less than the first output transition current $I_{T1}$.

The power supply with the output characteristic 300 illustrated in FIG. 3 operates along line segment 330 having slope $m_T$ in the regulated transition region of operation, to regulate output voltage and output current between a first transition point 355 at a first output transition voltage $V_{T1}$ corresponding to a first output transition current $I_{T1}$, and a second transition point 335 at second output transition voltage $V_{T2}$ corresponding to a second output transition current $I_{T2}$. Thus, in the illustrated example, the power supply operates in the regulated transition region of operation along line segment 330 and restricts the voltage and current to be less than the maximum power capability of the power supply with slope $m_T$ when the output current of the power supply is between first output transition current $I_{T1}$ and the second output transition current $I_{T2}$ and/or when the output voltage of the power supply is between first output transition voltage $V_{T1}$ and the second output transition voltage $V_{T2}$.

The power supply operates along line segment 340 having slope $m_I$ in the regulated current region of operation to regulate output current between $I_{T2}$ at the second transition point 335 and third transition point 345 at a third output transition voltage $V_{T3}$ corresponding to a third output transition current $I_{T3}$.

When the power supply is operating in the constant current region and the output voltage becomes less than $V_{T3}$, the power supply enters a foldback region of operation where further reduction in the output voltage results in a reduction in output current. In the foldback region of operation illustrated in FIG. 3, the power supply operates along line segment 365 having slope $m_F$ to regulate output current between $I_{T3}$ at the third transition point 345 and short circuit current $I_{SC}$ 360 at zero output voltage. Thus, in the illustrated example, the power supply operates in the foldback region of operation along line segment 350 with slope $m_F$ when the output voltage of the power supply is less than the third output transition voltage $V_{T3}$.

For embodiments of the present invention, simultaneous regulation of output voltage and output current allows a power supply with reduced power capability to satisfy requirements of battery chargers at lower cost than traditional designs. A regulated transition region between a voltage regulation region and a current regulation region allows the power supply to operate below the boundary of its maximum power capability. Signals from a voltage regulation circuit, a current regulation circuit, and a regulated transition circuit are summed to obtain a regulated transition region of the desired shape. Switch mode power supplies that operate with a regulated transition region can use smaller components to reduce the cost of power supply applications such as for example battery chargers or the like in accordance with the teachings of the present invention.

As shown in FIG. 2 and FIG. 3, the slope $m_V$ of line segments 220 and 320 in the regulated voltage region is not necessarily zero, and the slope $m_I$ of line segments 240 and 340 in the regulated current region is not necessarily infinite for embodiments of the present invention. Line segments 220, 240, 320, and 340 can have finite slopes or nonlinear characteristics as the result of non-ideal components or intentional shaping by the designer for particular applications. Line segments 230 and 330 can differ from straight lines to approximate more closely the curvature of the maximum capability boundaries 215 and 315. The output voltage and output current remain between the lines of the inner specification boundaries 250 and 350, the outer specification boundaries 210 and 310, and below the maximum power capability boundaries 215 and 315.

Figure 4:
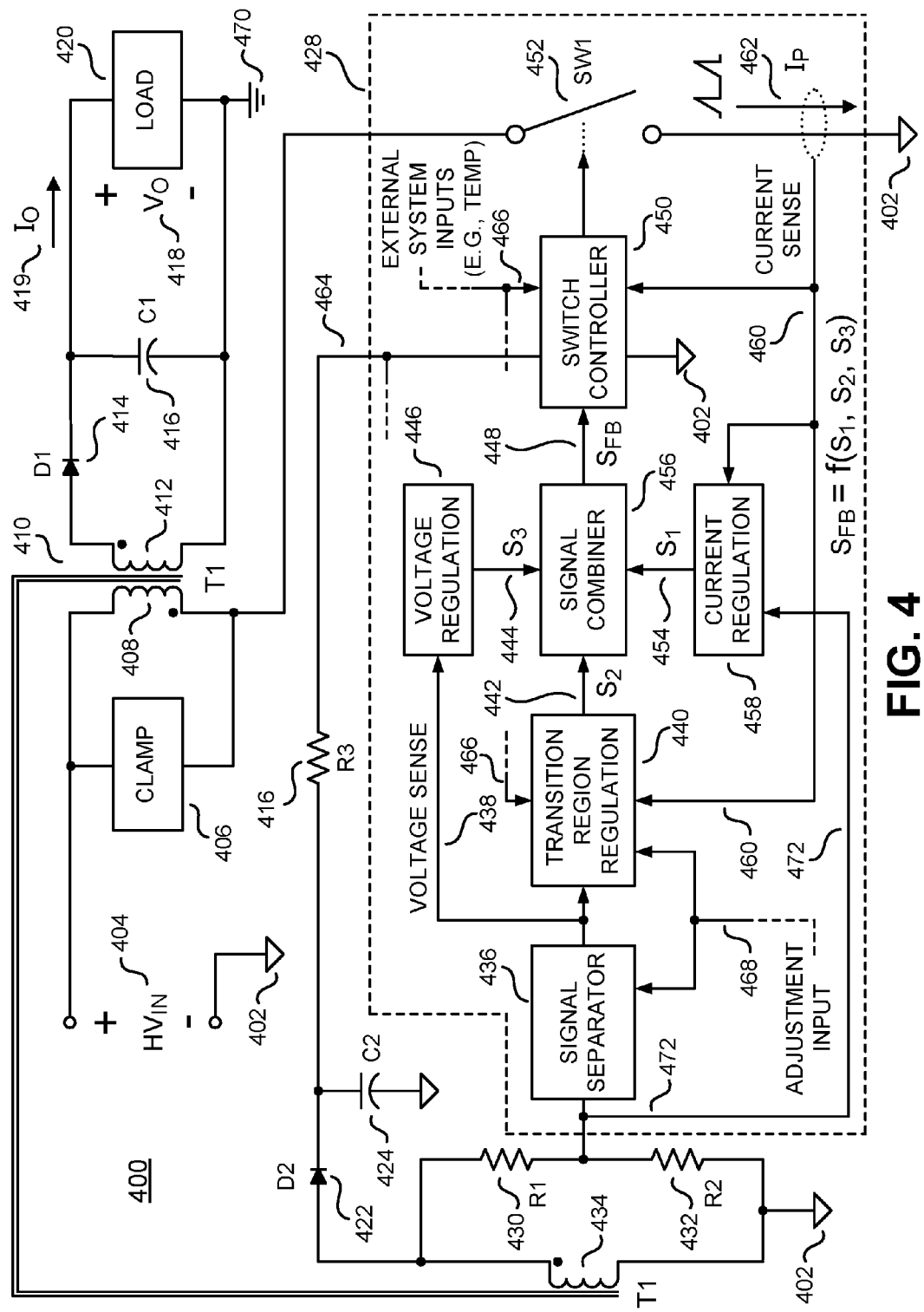
FIG. 4 is a functional block diagram of one example of a switch mode power supply that includes transition region regulation in accordance with the teaching of the present invention.

FIG. 4 is a functional block diagram 400 that uses the example of a flyback power supply to illustrate the principles of transition region regulation in accordance with teachings of the present invention. As will be discussed, the switch mode power supply illustrated in FIG. 4 is for an embodiment of the present invention that regulates the flow of energy to a load 420 from an unregulated dc input voltage $HV_{IN}$ 404 that is positive with respect to an input return 402. For one embodiment, dc input voltage $HV_{IN}$ 404 may be a rectified and filtered ac voltage. For one embodiment, the load 420 may be for example a rechargeable battery.

The input voltage $HV_{IN}$ 404 is coupled to an energy transfer element T1 410 and a power switch SW1 452. In the illustration of FIG. 4, energy transfer element T1 410 couples energy from the input to the output of a switch mode power supply in response to the switching of power switch SW1 452 to produce a regulated output voltage $V_O$ 418 that is positive with respect to an output return 470. Power switch SW1 452 may be called a primary power switch because of its location at the input of the power supply as explained later in this disclosure. It will be appreciated by those skilled in the art that the present invention may be applied to other power supply configurations, including those that use more than one power switch.

In the example of FIG. 4, energy transfer element T1 410 provides galvanic isolation between circuits on the input of the power supply and the circuits on the output of the power supply. In other words, a source of dc voltage applied between any conductor on the input of the power supply and any conductor on the output of the power supply would result in substantially zero current from the source of dc voltage. Galvanic isolation is typically required by safety agencies to protect users of the relatively low voltage at the output from being harmed by the relatively high voltage at the input. Components typically reside on either the input side or the output side of the isolation barrier provided by the energy transfer element. Circuits on the input side of the power supply have voltages referenced to the input return 402, whereas circuits on the output side of the power supply have voltages referenced to the output return 470.

In the example of FIG. 4, the energy transfer element T1 410 is a coupled inductor illustrated as a transformer with three windings. A primary winding 408 on the input side of the power supply receives the input voltage $HV_{IN}$ 404. A power switch such as SW1 452 that switches the primary winding may be called a primary power switch. A bias and sense winding 434 on the input side of the power supply provides power to operate control circuits while sensing input and output voltages. An output winding 412, sometimes called a secondary winding, provides power to the load 420. In general, the energy transfer element 410 can have more than three windings, with the additional windings providing power to additional loads or providing bias voltages for circuits on the input side or on the output side of the power supply. A clamp circuit 406 is coupled to the primary winding of the energy transfer element T1 410 to control the maximum voltage on the primary power switch SW1 452.

A switch controller circuit 450 switches the primary power switch SW1 452 on and off in response a feedback signal $S_{FB}$ 448 in accordance with the teachings of the present invention to regulate the output of the switched mode power supply. In addition to feedback signal $S_{FB}$ 448, the switch controller circuit 450 may receive a current sense signal 460 representative of the current $I_P$ 462 in the primary power switch SW1 452. The switch controller circuit 450 may also receive external system inputs 466 such as temperature information so that it may adjust the regulation of the output power of the power supply in response to temperatures. For one embodiment, primary power switch SW1 452 is a transistor. For one embodiment, primary power switch SW1 452 is a power metal oxide semiconductor field effect transistor (MOSFET). For one embodiment, the switch controller circuit 450 includes either an integrated circuit or discrete electrical components or both an integrated circuit and discrete electrical components. For one embodiment, an integrated circuit includes switch controller circuit 450 and primary power switch SW1 452.

The operation of primary power switch SW1 452 produces pulsating current $I_P$ 462 in the primary winding 408 of energy transfer element T1 410 to produce a pulsating current in secondary winding 412. Pulsating current in secondary winding 412 of energy transfer element T1 410 is rectified by a diode D1 414 and is filtered by a capacitor C1 416 to produce a substantially constant output that may be an output voltage $V_O$ 418 or a substantially constant output current $I_O$ 419 or a combination of output $V_O$ 418 and $I_O$ 419 to the load 420.

As shown in FIG. 4, a bias and sense winding 434 on energy transfer element T1 410 provides power to operate control circuits while sensing input and output voltages. Current from bias and sense winding 434 is rectified by a diode D2 422 and is filtered by a capacitor C2 424 to provide a bias voltage that may be received by a current limiting resistor R3 416 before providing power to circuits on the input side of the power supply at a bias terminal 464. FIG. 4 does not show all the circuits in the diagram coupled between the bias voltage and input return to avoid obscuring the essential elements of the invention.

In the example of FIG. 4, resistors R1 430 and R2 432 are coupled across the terminals of the bias and sense winding 434 to form a voltage divider network that senses the voltage at the input and at the output of the power supply. When primary power switch SW1 452 is closed, the voltage on the bias and sense winding 434 is representative of the input voltage $HV_{IN}$ 404. When primary power switch SW1 452 opens, the voltage on the bias and sense winding 434 is representative of the output voltage $V_O$ 418 for a period of time when output diode D1 414 is conducting current. Since the output voltage is sensed on the input side of the power converter using sense winding 434, the converter shown in FIG. 4 does not require any opto-coupler to transfer the output voltage sensing signal from the output side to the input side of the power converter. As such, the type of power converter shown in FIG. 4 is often referred to as a primary side regulated power converter. In addition, the controller circuit 428 is often referred to as a primary side regulation controller or PSR controller.

Signal separator circuit 436 receives the voltage from the voltage divider network to provide a sensed input voltage and a sensed output voltage to the control circuits on the input side of the power supply. In one embodiment, signal separator circuit 436 includes a diode to provide a voltage sense signal 438 that is representative of the output voltage $V_O$ 418. In one embodiment, not shown in FIG. 4, signal separator circuit 436 includes another diode to provide another voltage sense signal that is representative of the input voltage $HV_{IN}$ 404. In one embodiment, the voltage sense signal 438 may include time information as well as magnitude information extracted from the voltage on the bias and sense winding 434.

In one embodiment, signal separator circuit 436 may receive an adjustment input 468 to scale the value of the voltage sense signal 438 so that the output voltage may be set to a desired value. The adjustment input 468 may be an analog or a digital signal that may come from a battery-powered device that uses the output of the power supply to charge its battery. In one example, the adjustment input 468 may be received at a terminal of a controller of the power converter. In another example, the adjustment input 468 may be received at one or more terminals coupled to the output of the power converter. In yet another example, the terminals may be dedicated to data signals. In yet another example, the adjustment may be received as a coded sequence of steps in the value of load the 420.

In the example of FIG. 4, a current sense signal 460 is representative of the pulsating current $I_P$ 462 in primary power switch SW1 452. Current sense signal 460 may be obtained in any of several ways practiced in the art, such as for example with a current transformer, or for example by measuring the voltage between the drain and source terminals of a MOSFET when the transistor is conducting, or for example using a special current-sensing MOSFET structure sometimes referred to as a sense FET that directs a fraction of the switch current to a current sensing resistor.

Current sense signal 460 may be used by various circuits on the input side of the power supply for protection and control. Besides protecting the primary power switch SW1 452 from excess current, circuits on the input side of the power supply may extract information from current sense signal 460 to control output current $I_O$ 419 as well as the current from the unregulated input source $HV_{IN}$ 404. For instance, in one example it is appreciated that the sensed switch current may be processed in combination with input voltage sense and output voltage sense and/or timing quantities as indicated by signal 472 from the voltage divider network to provide constant output current in a flyback power supply. In another example, it is appreciated that the sensed switch current may be used to control input current to achieve a high power factor while maintaining a constant output current in a flyback power supply. In various examples the output current $I_O$ 419 can be determined in response to voltage sense signal 438 and the current sense signal 460. In other examples, it is appreciated that the output current $I_O$ 419 may be determined by measuring the output current $I_O$ 419 directly.

In the example of FIG. 4, a current regulation circuit 458, a transition regulation circuit 440, and a switch controller circuit 450 receive current sense signal 460 that is representative of the current in the switch of the power converter to provide a regulated transition region of operation in accordance with the teaching of the present invention.

In the example of FIG. 4, switch controller circuit 450 receives a feedback signal $S_{FB}$ 448 in response to a voltage sense signal 438 and/or a current sense signal 460. Feedback signal $S_{FB}$ 448 is considered to be active if it is non-zero. A feedback signal of zero is considered to be a loss of feedback. For one embodiment, feedback signal $S_{FB}$ 480 is active and non-zero during all regions of operation including operation of the power supply along line segments 220, 230 and 240 of FIG. 2 and along line segments 320, 330, 340, and 365 of FIG. 3 when regulating the output of the power supply.

For one embodiment, feedback signal SFB 448 is a function of, or is responsive to, a current regulation signal $S_1$ 454 from current regulation circuit 458, a transition region regulation signal $S_2$ 442 from a transition regulation circuit 440, and a voltage regulation signal $S_3$ 444 from a voltage regulation circuit 446. For one embodiment, a signal combiner 456 combines regulation signal $S_1$ 454, regulation signal $S_2$ 442, and regulation signal $S_3$ 444 to provide the combined feedback signal $S_{FB}$ 448 received by the switch controller circuit 450. In one embodiment, signal combiner 456 may be a summation circuit. In another embodiment, signal combiner 456 may be a circuit that multiplies two or more signals.

It will be appreciated by those skilled in the art that a signal separator circuit 436, a transition region regulation circuit 440, a voltage regulation circuit 446, a current regulation circuit 458, a signal combiner circuit 456, a switch controller circuit 450, a primary power switch SW1 452 with current sensing capability may be either included in an integrated circuit or assembled from multiple integrated circuits into a controller 428 for a power supply with transition region regulation.

For embodiments of the present invention, transition region regulation circuit 440 provides regulated operation of the power supply with feedback in the transition region of operation for example along line segments 130 of FIG. 1, or for example along line segment 230 of FIG. 2, or for example along line segment 330 of FIG. 3 in accordance with the teachings of the present invention. As a result, there may be an active (non-zero) feedback signal provided by transition region regulation circuit 440 when the power supply operates in the transition region of operation. The regulated transition regions along line segments 130, 230 and 330 allow the power supply to restrict the voltage and current to be less than the maximum power capability of the power supply in accordance with the teachings of the present invention. The output of the signal combiner circuit 456 is a feedback signal $S_{FB}$ 448 that is received by the switch controller circuit 450.

In one example, feedback signal $S_{FB}$ 448 may be a current. If current regulation signal S1 454, transition region regulation signal S2 442, and voltage regulation signal S3 444 are also currents, then the signal combiner circuit 456 may be a summation circuit, and the summation circuit may be just a node. For instance, in one example, current regulation circuit 458 is coupled to compare current sense signal 460 with a current reference signal and produce a current for regulation signal $S_1$ 454 in response to the difference between the current sense signal 460 and the current reference signal. In one example, voltage regulation circuit 446 is coupled to compare voltage sense signal 438 a voltage reference signal and produce a current for regulation signal $S_3$ 444 in response to the difference between the voltage sense signal 438 and the voltage reference signal. In one example, transition region regulation circuit 440 is coupled to compare a combination of voltage sense signal 438 and current sense signal 460 in response to adjustment input 468, and compare the combination with a transition region reference signal and produce a current for regulation signal $S_2$ 442. In an example in which signal combiner circuit 456 is a node, all three currents for regulation signal $S_1$ 454, regulation signal $S_2$ 441, and regulation signal $S_3$ 444 are combined at the node in signal combiner circuit 456 to produce feedback signal $S_{FB}$ 448, which is coupled to be received by switch controller 450.

As mentioned above, transition region regulation circuit 440 receives voltage sense signal 438, current sense signal 460, and an adjustment input 468 in the example depicted in FIG. 4. In one embodiment, adjustment signal 468 may adjust the output transition voltages and output transition currents. It is appreciated that the transition region regulation circuit 440 may receive other signals such as for example external system inputs 466 that may include temperature information to adjust the output transition voltages and output transition currents.

Figure 5:
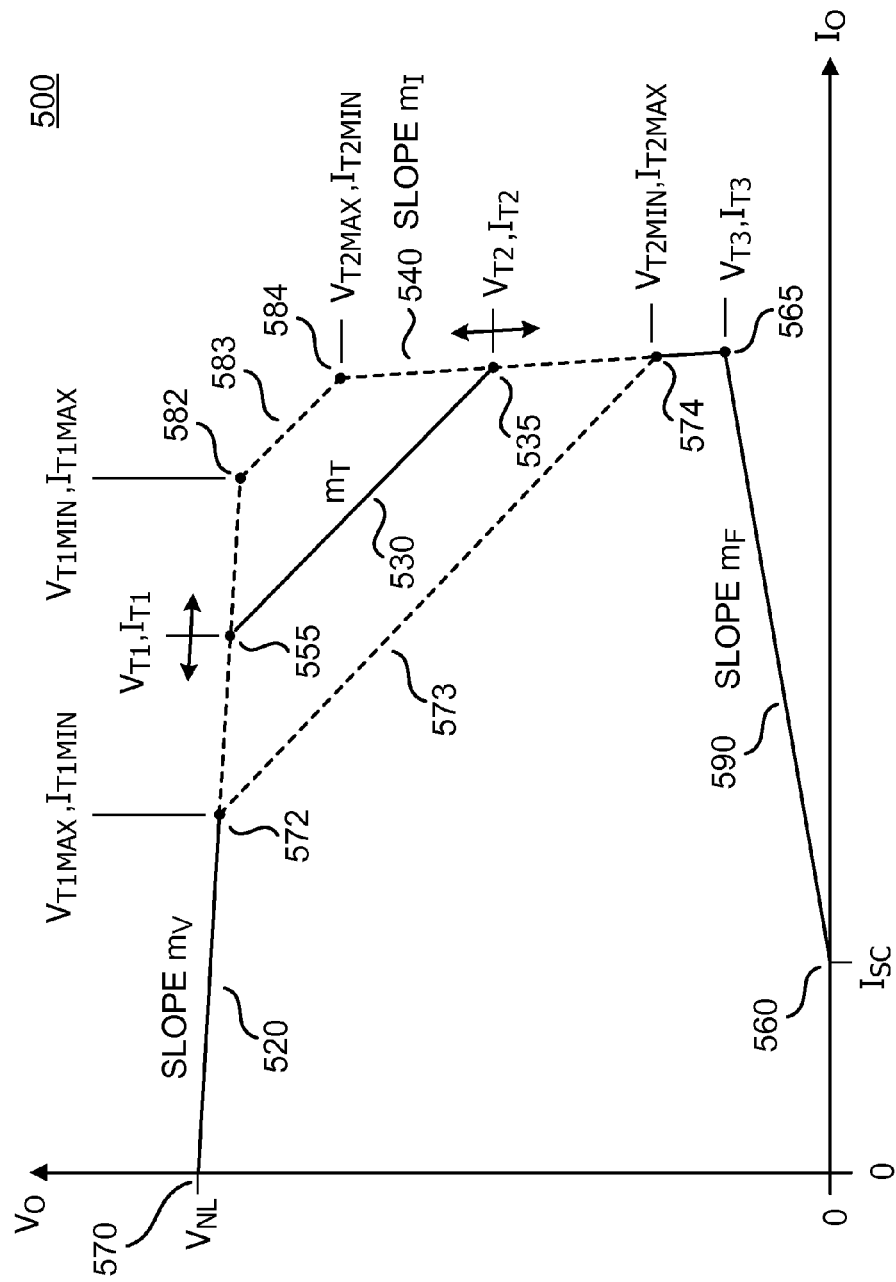
FIG. 5 shows the output characteristics of a power supply with linear transition region regulation and adjustable current and voltage thresholds in accordance with the teachings of the present invention.

FIG. 5 is graph 500 that shows the locus of output voltage and output current of a power supply with a regulated voltage region, a transition region regulation, a regulated current region, a foldback region, and adjustable transition thresholds. The power supply with the output characteristic illustrated in FIG. 5 operates along line segment 520 having slope $m_V$ in the regulated voltage region of operation, regulating the output voltage between a no-load voltage $V_{NL}$ 570 at zero output current and a first transition voltage $V_{T1}$ corresponding to a first transition current $I_{T1}$, where the quantities $V_{T1}$ and $I_{T1}$ define a first transition point 555. The first transition point 555 may be adjusted between an inner transition point 572 and an outer transition point 582, where the inner transition point 572 corresponds to an inner transition point voltage $V_{T1MAX}$ and an inner transition point current $I_{T1MIN}$, and the outer transition point 582 corresponds to an outer transition point voltage $V_{T1MIN}$ and an outer transition point current $I_{T1MAX}$. The inner transition point 572 and the outer transition point 582 may lie on the line defined by the no-load voltage $V_{NL}$ 570 and the slope my.

The power supply with the output characteristic illustrated in FIG. 5 operates along line segment 530 having slope $m_T$ in the regulated transition region of operation to regulate output voltage and output current between a first transition point 555 and a second transition point 535. The second transition point 535 may be adjusted between an upper transition point 584 and a lower transition point 574, where the upper transition point 584 corresponds to an upper transition point voltage $V_{T2MAX}$ and an upper transition point current $I_{T2MIN}$, and the lower transition point 574 corresponds to a lower transition point voltage $V_{T2MIN}$ and a lower transition point current $I_{T2MAX}$. The upper transition point 584 and the lower transition point 574 may lie on the line defined by the second transition point 535 and the slope $m_T$.

Independent adjustment of the first transition point 555 and the second transition point 535 may select a linear regulated transition characteristic within the region bounded by line segments 573 and 583 with a slope $m_T$ defined by first and second transition points.

In the regulated current region of operation, the power supply operates along line segment 540 having slope $m_I$ to regulate output current between $I_{T2}$ at the second transition point 535 and third transition point 565 at a third output transition voltage $V_{T3}$ corresponding to a third output transition current $I_{T3}$.

When the power supply is operating in the constant current region and the output voltage becomes less than $V_{T3}$, the power supply enters a foldback region of operation where further reduction in the output voltage results in a reduction in output current. In the foldback region of operation illustrated in FIG. 5, the power supply operates along line segment 590 having slope $m_F$ to regulate output current between $I_{T3}$ at the third transition point 565 and short circuit current $I_{SC}$ 560 at zero output voltage. Thus, in the illustrated example, the power supply operates in the foldback region of operation along line segment 590 with slope $m_F$ when the output voltage of the power supply is less than the third output transition voltage $V_{T3}$.

Those skilled in the art will appreciate that it is not necessary for a regulated transition region to have a linear characteristic with a constant slope $m_T$. In some applications it may desirable for the output of a power supply to have a regulated transition region with a constant power characteristic. A constant power characteristic maintains a relatively constant value for the product of output voltage and output current.

Figure 6:
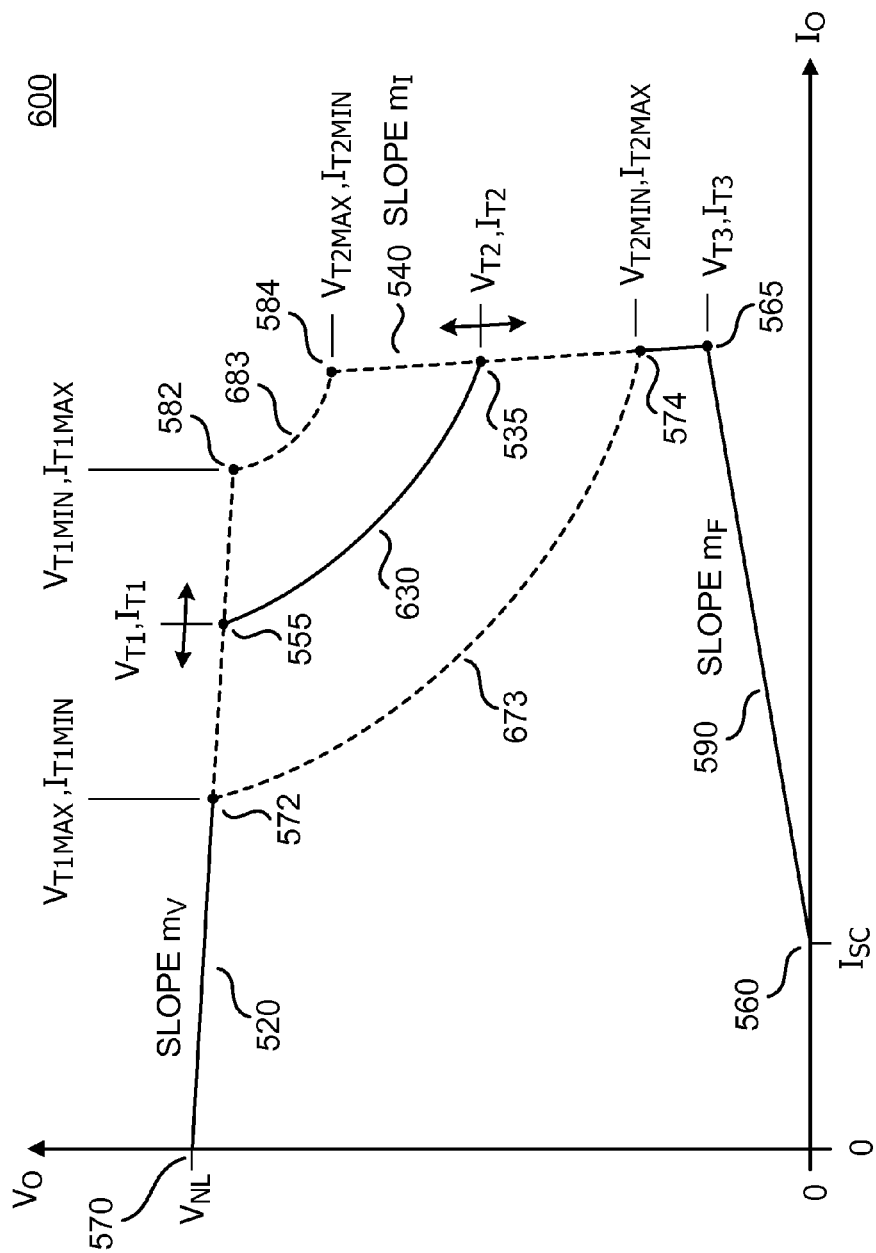
FIG. 6 shows the output characteristics of a power supply with constant-power transition region regulation and adjustable current and voltage thresholds in accordance with the teachings of the present invention.

FIG. 6 shows a graph 600 of an example output characteristic of a power supply that has a regulated transition region with a constant power characteristic 630 between adjustable transition points 555 and 535. The example of FIG. 6 shows that first and second transition points may be adjusted to define constant power regulated transition regions within the boundaries defined by the curves 673 and 683.

Figure 7:
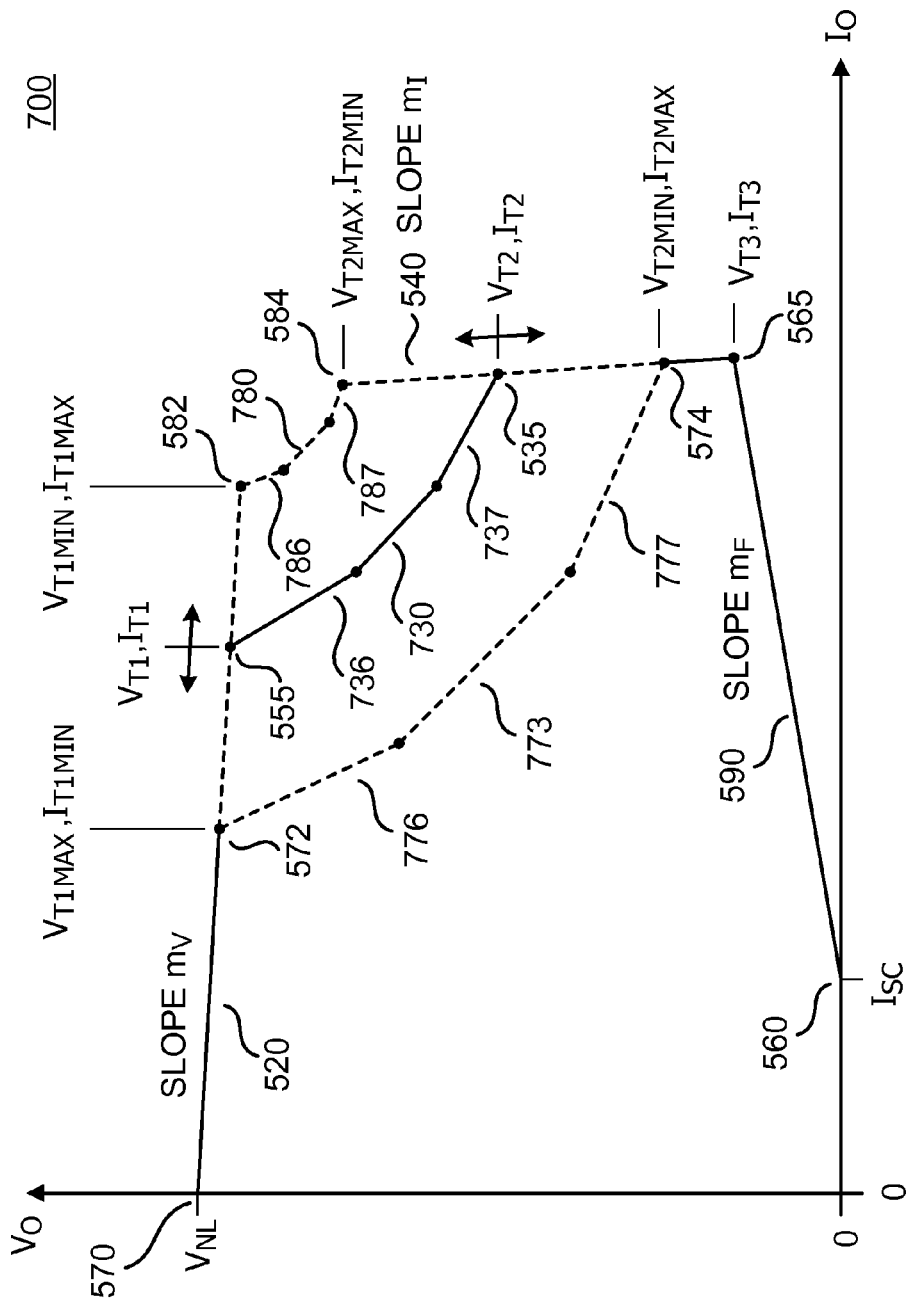
FIG. 7 shows the output characteristics of a power supply with piecewise linear transition region regulation approximating constant-power transition region regulation and adjustable current and voltage thresholds in accordance with the teachings of the present invention.

It is appreciated also that a constant power characteristic may be approximated by multiple linear segments. To illustrate, FIG. 7 shows a graph 700 of an example output characteristic of a power supply that has a regulated transition region with linear segments 736, 730, and 737 that give a piecewise linear approximation to a constant power characteristic between adjustable transition points 555 and 535. The example of FIG. 7 also shows that the first and second transition points may be adjusted to define piecewise linear approximations to a constant power regulated transition region within a lower boundary defined by line segments 776, 773, and 777 and an upper boundary defined by line segments 786, 787, and 780.

Figure 8:
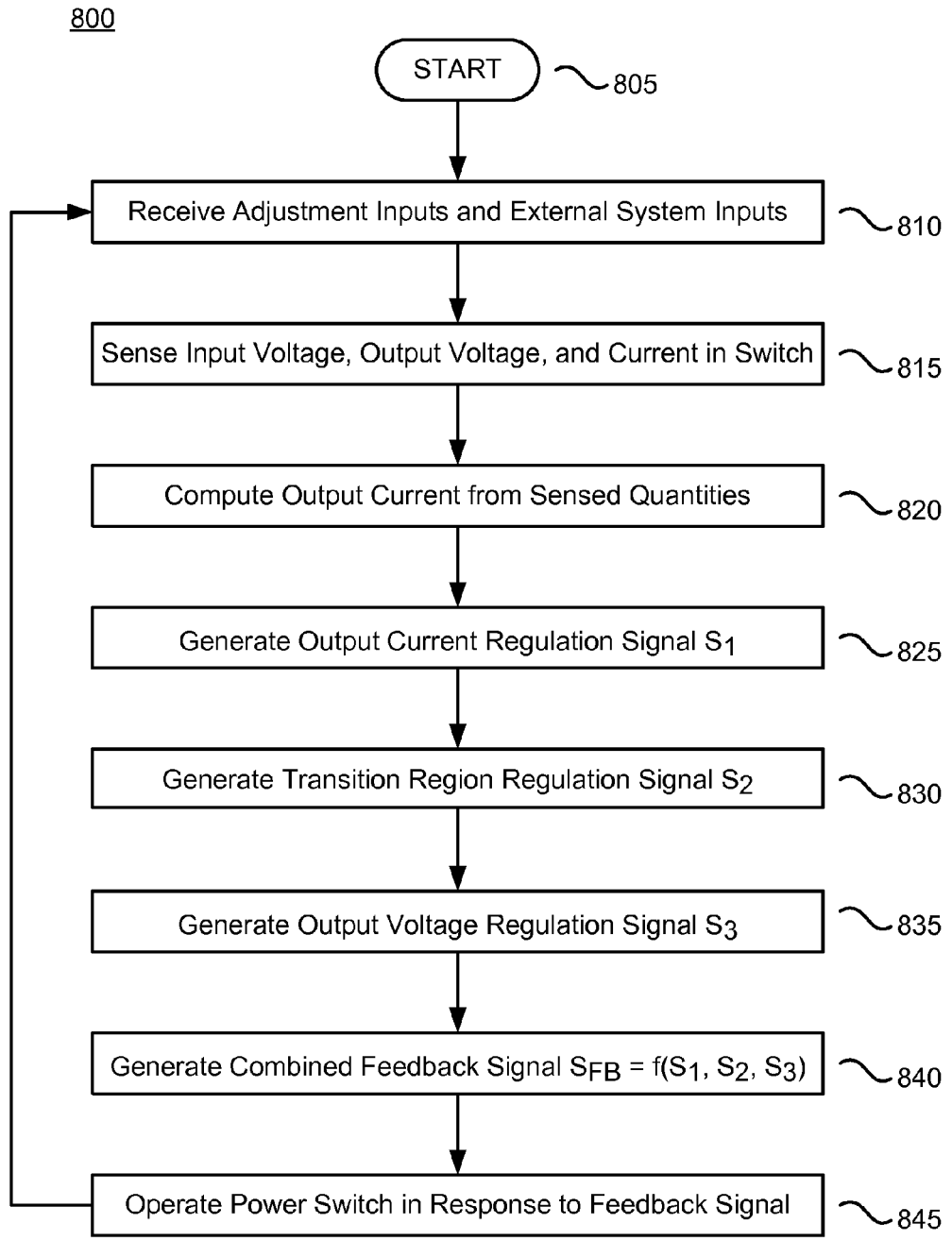
FIG. 8 is a flow diagram that describes a method of controlling a power supply having transition region regulation with adjustable current and voltage thresholds in accordance with the teachings of the present invention.

FIG. 8 is a flow diagram 800 that describes a method of controlling a power supply having transition region regulation with adjustable current and voltage thresholds in accordance with the teachings of the present invention.

After starting in block 805, the controller for the power supply receives adjustment inputs and external system inputs in block 810. The adjustment inputs may be in the form of an analog or a digital communication from a battery-powered device that uses the power supply to charge its battery. The external system inputs may be in the form of an electrical signal or a value of a physical parameter such as for example an electrical resistance that changes in response to temperature.

Next, in block 815 the controller for the power supply senses the input voltage, the output voltage, and the pulsating current in a primary switch. Then in block 820 the controller computes the output current from the sensed quantities.

From the computed output current and the sensed output voltage the controller generates a current regulation signal $S_1$, a transition region regulation signal $S_2$, and an output voltage regulation signal $S_3$ in blocks 825, 830, and 835 respectively. The controller then generates a feedback signal $S_{FB}$ that is a combination, or a function, of $S_1$, $S_2$ and $S_3$ in block 840. A switch controller operates the primary switch in response to the feedback signal $S_{FB}$ in block 845. The process continues by returning to block 810.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A method for regulating a flow of energy from an input of a power converter to an output of the power converter, comprising:
   receiving a first signal representative of an output voltage of the power converter;
   receiving a second signal representative of a current of the power converter;
   determining an output current of the power converter in response to at least one of the first and second signals;
   switching a power switch of the power converter to regulate the output current of the power converter to a substantially constant output current value for a first range of power converter output voltages;
   switching the power switch of the power converter to regulate an output power of the power converter to a substantially constant power value for a second range of power converter output voltages;
   switching the power switch of the power converter to regulate the output voltage of the power converter at substantially a highest output voltage value of the second range of power converter output voltages for a range of power converter output current values;
   adjusting the first range of power converter output voltages and the second range of power converter output voltages in response to an adjustment signal received at a terminal of a controller of the power converter.

2. The method of claim 1 wherein receiving the second signal representative of the current of the power converter comprises measuring a switch current of the power switch of the power converter.

3. The method of claim 1 further comprising adjusting the highest output voltage value of the second range of power converter output voltages in response to the output current of the power converter.

4. The method of claim 1 wherein the power converter is a flyback converter.

5. The method of claim 1 wherein adjusting the first range of power converter output voltages and the second range of power converter output voltages in response to the adjustment signal comprises receiving the adjustment signal at one or more terminals coupled to the output of the power converter.

6. The method of claim 1 wherein the first range of power converter output voltages and the second range of power converter output voltages is substantially constant.

7. The method of claim 1 further comprising adjusting the substantially constant power value for the second range of power converter output voltages in response to a temperature.

8. The method of claim 1 wherein the first signal is received from a sense winding on an input side of the power converter.

9. A regulator circuit for use in a power converter, comprising:
   a voltage regulation circuit coupled to receive a first signal representative of an output voltage at an output of the power converter, wherein the voltage regulation circuit is coupled to generate a third regulation signal in response to the first signal;
   a current regulation circuit coupled to receive a second signal representative of a current of the power converter, wherein the current regulation circuit is coupled to determine an output current of the power converter in response to the second signal and generate a first regulation signal in response to the second signal;

a transition region regulation circuit coupled to receive the first signal, the second signal, and an adjustment signal received at a terminal of the regulation circuit, wherein the transition region regulation circuit is coupled to generate a second regulation signal in response to the first signal, the second signal, and the adjustment signal; and a controller coupled to receive a feedback signal responsive to the first, second and third regulation signals, wherein the controller is coupled to generate a drive signal in response to the feedback signal to control a switching of a power switch of the power converter to regulate the output current of the power converter to a substantially constant output current value for a first range of power converter output voltages, wherein the switching of the power switch is further coupled to regulate an output power of the power converter to a substantially constant power value for a second range of power converter output voltages, wherein the controller is coupled to adjust the first range of power converter output voltages and the second range of power converter output voltages in response to the adjustment signal, and wherein the switching of the power switch is further coupled to regulate the output voltage of the power converter at substantially a highest output voltage value of the second range of power converter output voltages for a range of power converter output current values.

10. The regulator circuit of claim 9 further comprising a combiner circuit coupled to receive the first, second, and third regulation signals to generate the feedback signal output in response to the first, second, and third regulation signals.

11. The regulator circuit of claim 10 wherein the combiner circuit is a summation circuit.

12. The regulator circuit of claim 9 wherein the current regulation circuit is coupled to measure a switch current of the power switch of the power converter.

13. The regulator circuit of claim 9 wherein the power converter is a flyback converter.

14. The regulator circuit of claim 9 wherein the first and second signals are generated on an input side of the power converter.

15. A regulator circuit for use in a power converter, comprising:

a power switch; and a controller coupled to the power switch, and coupled to receive a first signal representative of an output voltage of the power converter, a second signal representative a current of the power converter, and an adjustment signal received at a terminal of the controller, wherein the regulator circuit is coupled to determine the output voltage and an output current of the power converter in response to at least the first and second signals and the adjustment signal, wherein the controller is coupled to control a switching of the power switch to regulate the output current of the power converter to a substantially constant output current value for a first range of power converter output voltages, wherein the switching of the power switch is further coupled to regulate an output power of the power converter to a substantially constant power value for a second range of power converter output voltages, wherein the controller is coupled to adjust the first range of power converter output voltages and the second range of power converter output voltages in response to the adjustment signal, and wherein the switching of the power switch is further coupled to regulate the output voltage of the power converter at substantially a highest output voltage value of the second range of power converter output voltages for a range of power converter output current values.

16. The regulator circuit of claim 15 wherein the first and second signals are generated on the primary side of the power converter.

\* \* \* \* \*